United States Patent
Manikas et al.

(10) Patent No.: US 10,975,732 B2
(45) Date of Patent: Apr. 13, 2021

(54) ROTOR TURNING DEVICE FOR BALANCING A WIND TURBINE ROTOR

(71) Applicant: General Electric Company, Schenectady, NY (US)

(72) Inventors: Brian William Manikas, Schenectady, NY (US); John Carl Bell, Chesapeake, VA (US); Sebastian Freiheit, Selfkant (DE); Christoph Graf, Hückelhoven (DE); Adam Sean Philip David Davis, Red Feather Lakes, CO (US); Michael Royce Johnson, Campton, NH (US); Ulrich Werner Neumann, Simpsonville, SC (US); Christoph Lammen, Salzbergen (DE)

(73) Assignee: General Electric Company, Schenectady, NY (US)

( * ) Notice: Subject to any disclaimer, the term of this patent is extended or adjusted under 35 U.S.C. 154(b) by 53 days.

(21) Appl. No.: 16/375,100

(22) Filed: Apr. 4, 2019

(65) Prior Publication Data
US 2020/0318496 A1 Oct. 8, 2020

(51) Int. Cl.
*F03D 13/35* (2016.01)
*F01D 25/34* (2006.01)
*F03D 80/50* (2016.01)

(52) U.S. Cl.
CPC ............ *F01D 25/34* (2013.01); *F03D 13/35* (2016.05); *F03D 80/50* (2016.05); *F05B 2230/80* (2013.01); *F05B 2260/966* (2013.01)

(58) Field of Classification Search
None
See application file for complete search history.

(56) References Cited

U.S. PATENT DOCUMENTS

| | | | | |
|---|---|---|---|---|
| 4,201,514 A | * | 5/1980 | Huetter | F03D 1/0658 416/102 |
| 4,596,209 A | * | 6/1986 | Haslach, Jr. | F03D 9/22 122/26 |
| 5,140,856 A | | 8/1992 | Larsen | |
| 5,219,454 A | | 6/1993 | Class | |

(Continued)

FOREIGN PATENT DOCUMENTS

| | | | |
|---|---|---|---|
| EP | 1167754 | 1/2002 | |
| EP | 2963286 A1 | 1/2016 | |
| EP | 2987999 A1 * | 2/2016 | F03D 80/00 |

OTHER PUBLICATIONS

European Search Report, dated Aug. 31, 2020 for EP Application No. 20168025.3.

*Primary Examiner* — Michael Lebentritt
(74) *Attorney, Agent, or Firm* — Dority & Manning, P.A.

(57) ABSTRACT

A rotor turning device for balancing a rotor secured atop a tower of a wind turbine during installation and/or repair of one or more rotor blades of the wind turbine includes a hydraulic drive mechanism for operably engaging with a brake disc of the wind turbine. The brake disc is positioned adjacent to a gearbox of the wind turbine. The rotor turning device also includes a mounting device for securing the rotor turning device adjacent to the brake disc of the wind turbine. Thus, when the hydraulic drive mechanism engages the brake disc, the rotor is rotated to a desired position so as to position one or more rotor blades of the wind turbine in a balanced configuration.

17 Claims, 7 Drawing Sheets

(56) References Cited

U.S. PATENT DOCUMENTS

| | | | |
|---|---|---|---|
| 6,609,889 B1* | 8/2003 | Vilsboll | F03D 7/0224 415/4.3 |
| 8,683,688 B2 | 4/2014 | Axelsson et al. | |
| 2006/0210406 A1* | 9/2006 | Harvey | F03D 7/043 417/334 |
| 2008/0181761 A1* | 7/2008 | Moore | F03D 7/0248 415/1 |
| 2008/0247873 A1 | 10/2008 | Egedal | |
| 2009/0162202 A1* | 6/2009 | Nies | F03D 7/0244 416/147 |
| 2009/0278359 A1* | 11/2009 | Trede | F01D 25/36 290/55 |
| 2009/0317250 A1* | 12/2009 | Gamble | F03D 9/255 416/1 |
| 2010/0060000 A1* | 3/2010 | Scholte-Wassink | F03D 7/0284 290/44 |
| 2010/0320770 A1* | 12/2010 | Dahlhaug | F03D 9/28 290/55 |
| 2011/0085756 A1* | 4/2011 | Hori | F16C 19/181 384/513 |
| 2011/0103950 A1* | 5/2011 | Pesetsky | F03D 1/0675 416/1 |
| 2011/0206515 A1* | 8/2011 | Edenfeld | F03D 7/0204 416/147 |
| 2012/0047886 A1* | 3/2012 | Tsutsumi | F03D 9/25 60/398 |
| 2012/0091724 A1* | 4/2012 | Bodenstein | H02K 11/40 290/55 |
| 2012/0133147 A1* | 5/2012 | Numajiri | F03D 7/0268 290/55 |
| 2012/0133148 A1* | 5/2012 | Romeo | F03D 80/70 290/55 |
| 2012/0137481 A1* | 6/2012 | Lindberg | F03D 13/10 29/23.51 |
| 2013/0076042 A1* | 3/2013 | Amano | F03D 15/20 290/55 |
| 2013/0228397 A1* | 9/2013 | Horn | F03D 80/50 182/141 |
| 2013/0300125 A1* | 11/2013 | Ruschoff | F03D 13/00 290/55 |
| 2013/0336775 A1* | 12/2013 | Blake | F03D 1/0625 415/207 |
| 2013/0341934 A1* | 12/2013 | Kawanishi | F03D 80/70 290/1 A |
| 2014/0133983 A1* | 5/2014 | Canedo Pardo | F03D 7/0248 416/9 |
| 2015/0014993 A1* | 1/2015 | Grant | F03D 7/0244 290/44 |
| 2015/0159625 A1* | 6/2015 | Hardwicke, Jr. | F03D 7/0272 290/44 |
| 2015/0308467 A1* | 10/2015 | Brokes | F15B 15/18 60/327 |
| 2016/0017865 A1* | 1/2016 | Illing | F03D 7/04 416/1 |
| 2016/0061191 A1* | 3/2016 | Wilson | F03D 80/88 290/55 |
| 2018/0034264 A1* | 2/2018 | Wagoner | F03D 7/0244 |
| 2018/0313329 A1* | 11/2018 | Vanderwalker | F03D 80/50 |
| 2019/0264654 A1* | 8/2019 | Spink | F03D 7/0248 |
| 2019/0277393 A1* | 9/2019 | Hasan | F03D 80/50 |
| 2019/0345914 A1* | 11/2019 | Thomsen | F16D 63/006 |
| 2020/0072188 A1* | 3/2020 | Neumann | F03D 13/10 |
| 2020/0132045 A1* | 4/2020 | Curtis | F03D 7/0264 |
| 2020/0158079 A1* | 5/2020 | Torrecilla Contreras | F03D 15/00 |

* cited by examiner

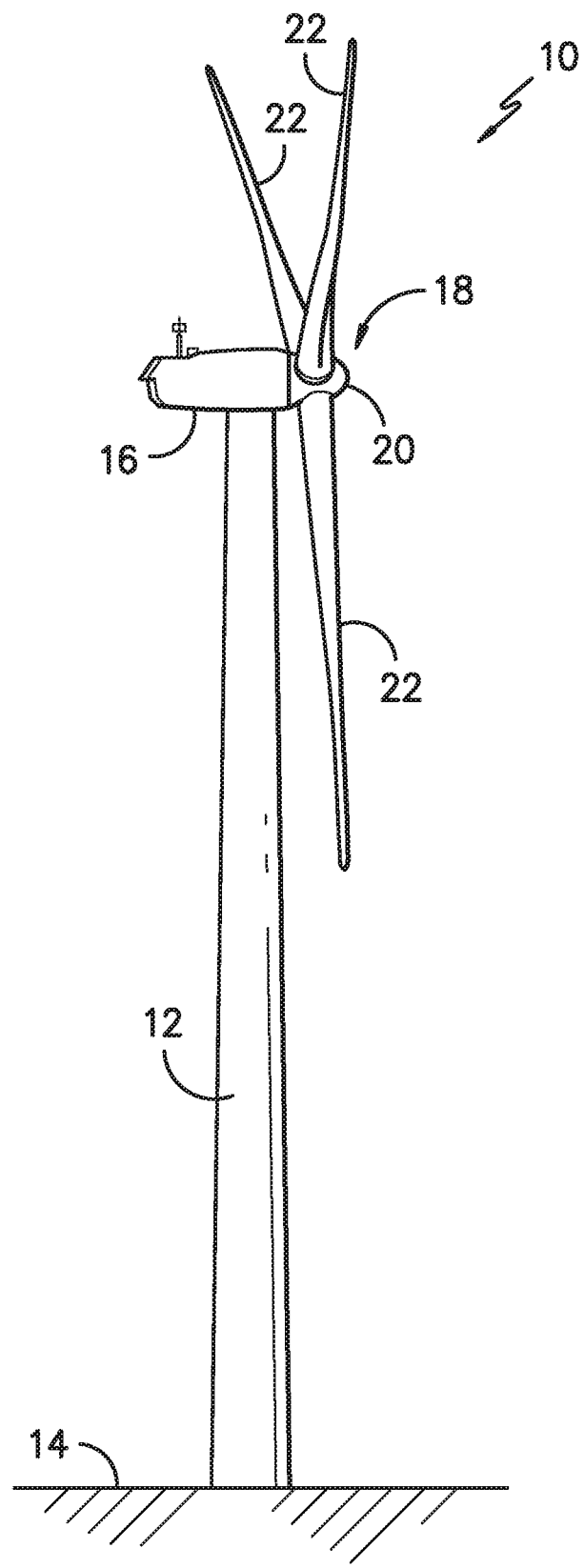
FIG. -1-

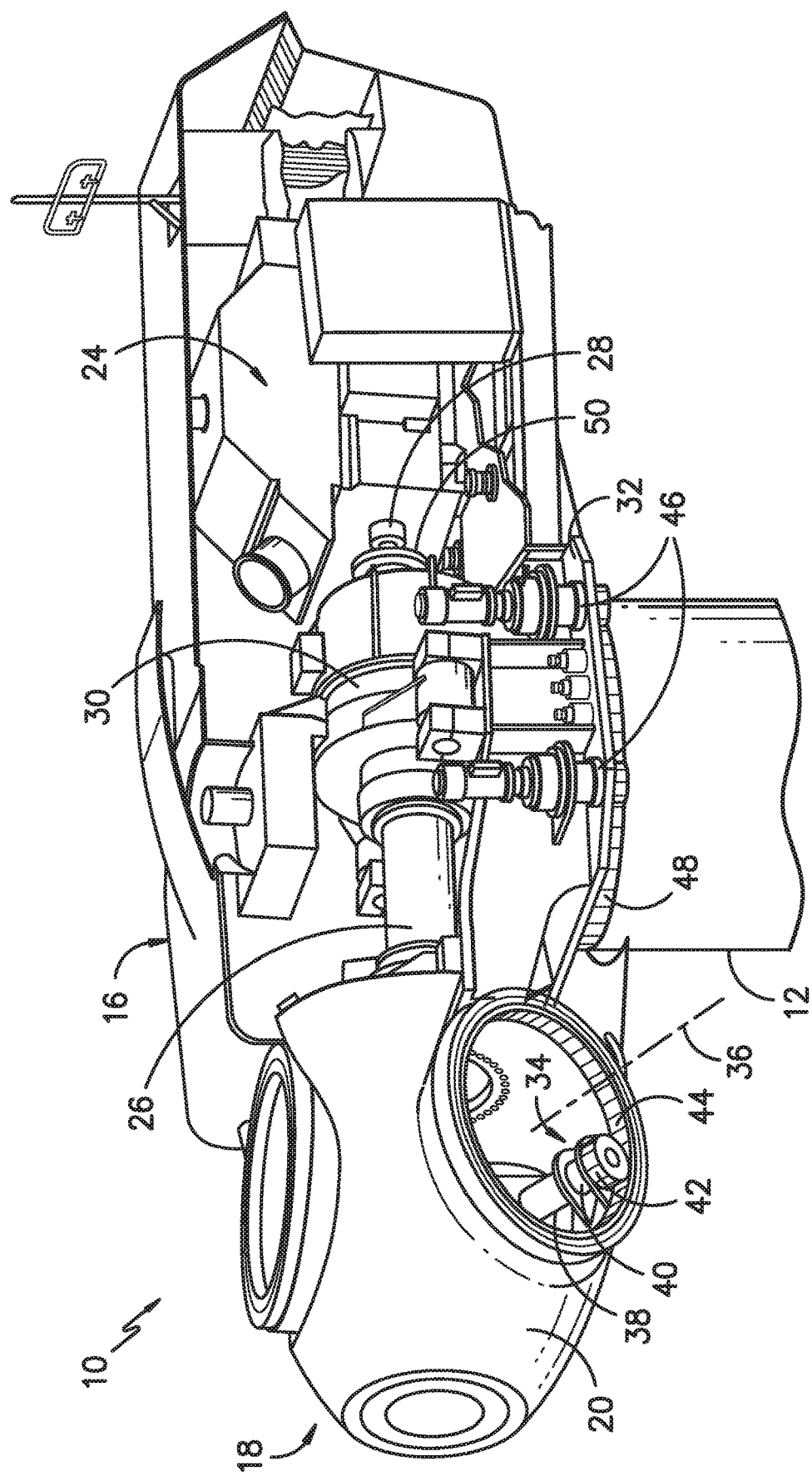
FIG. -2-

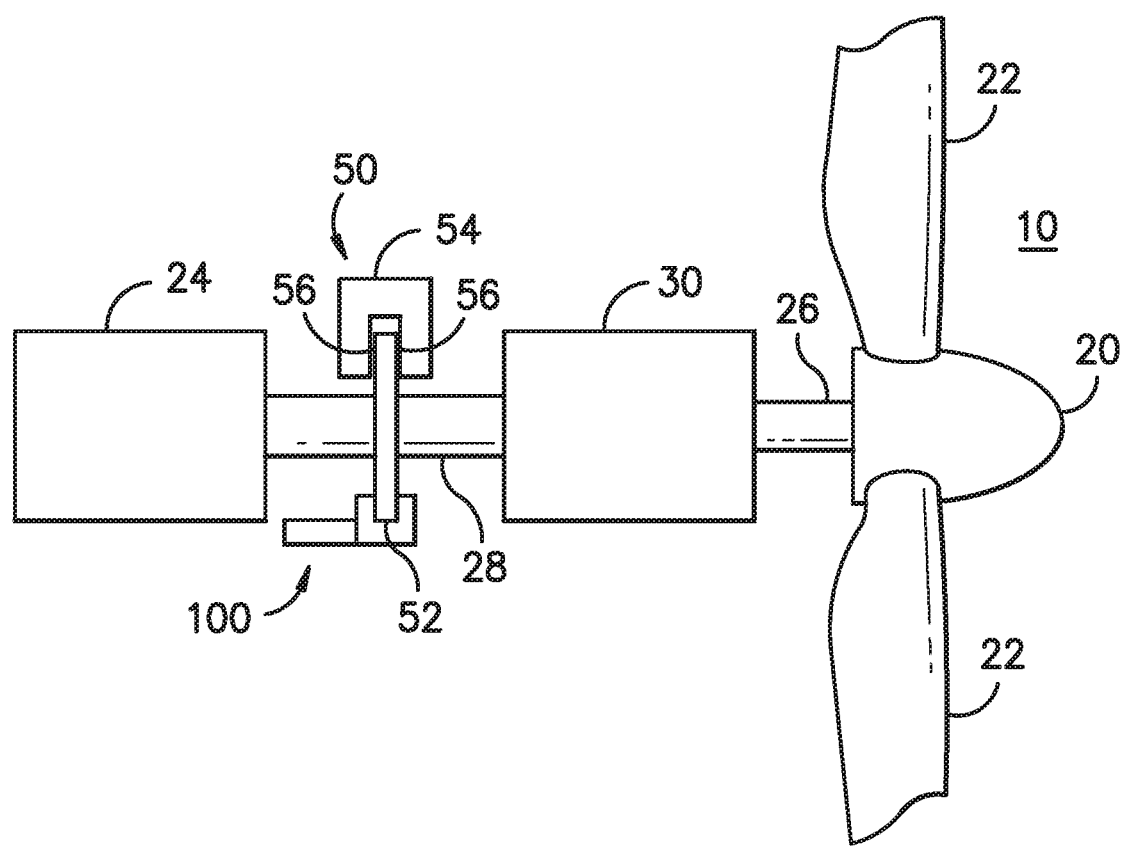
FIG. -3-

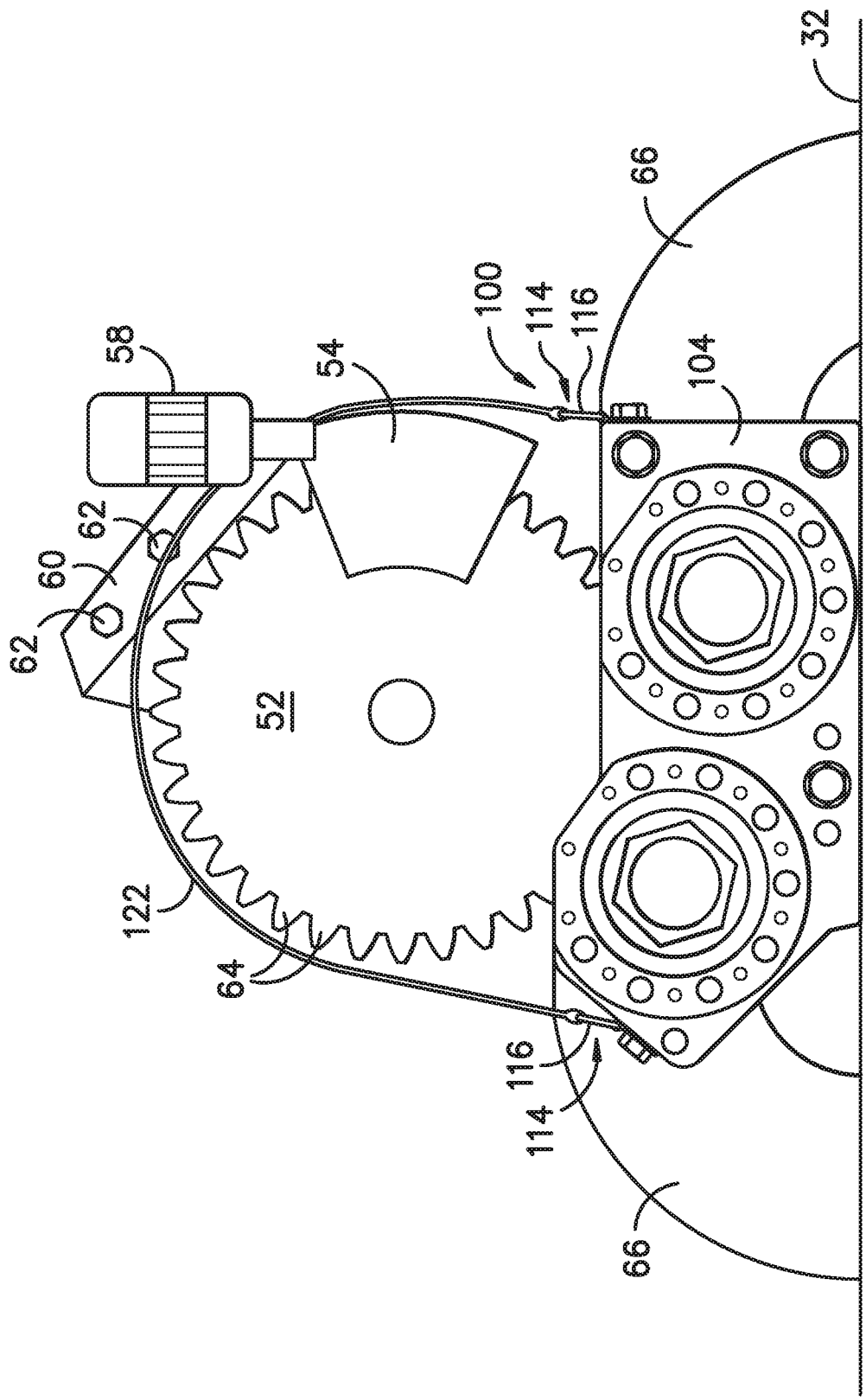
FIG. -4-

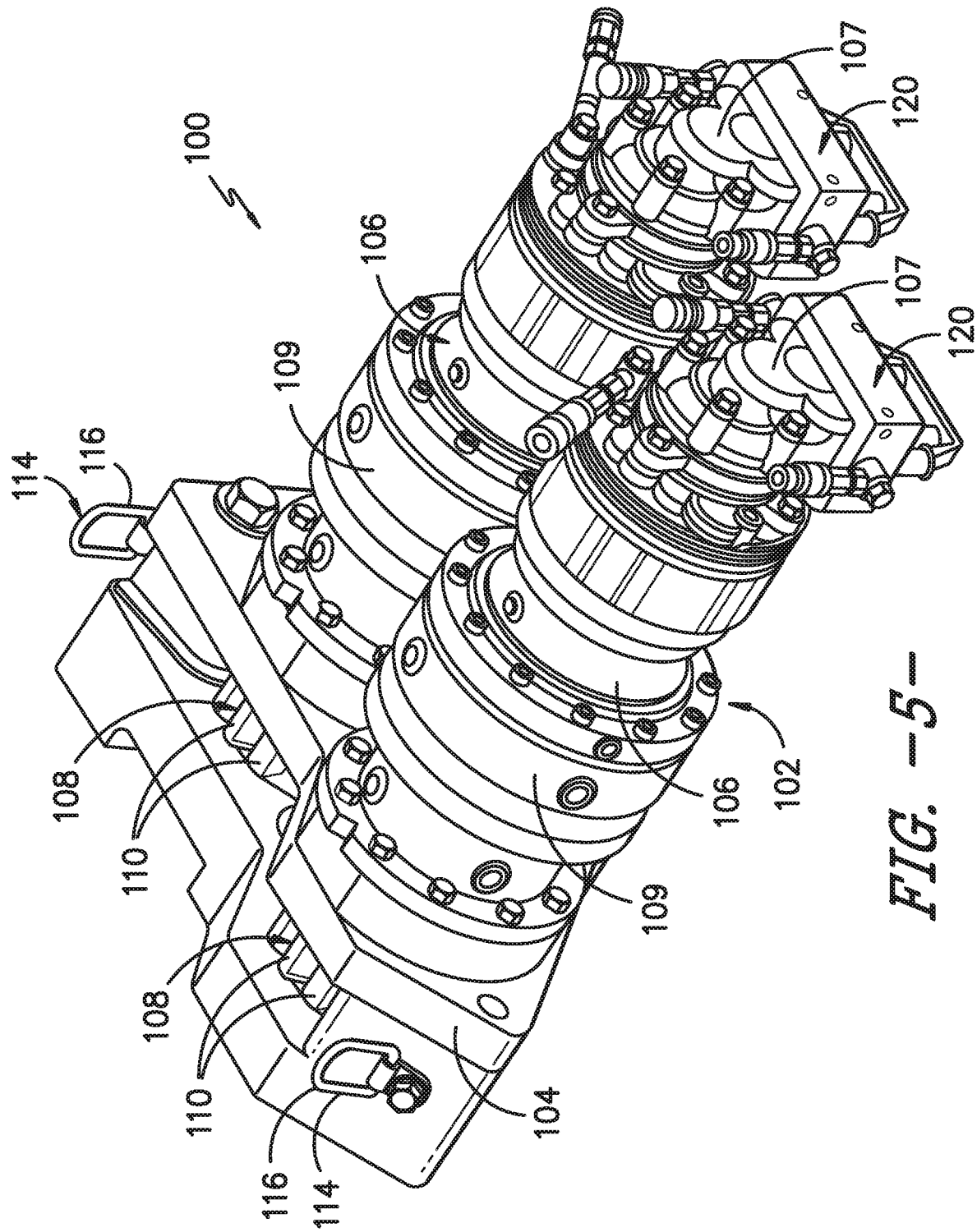

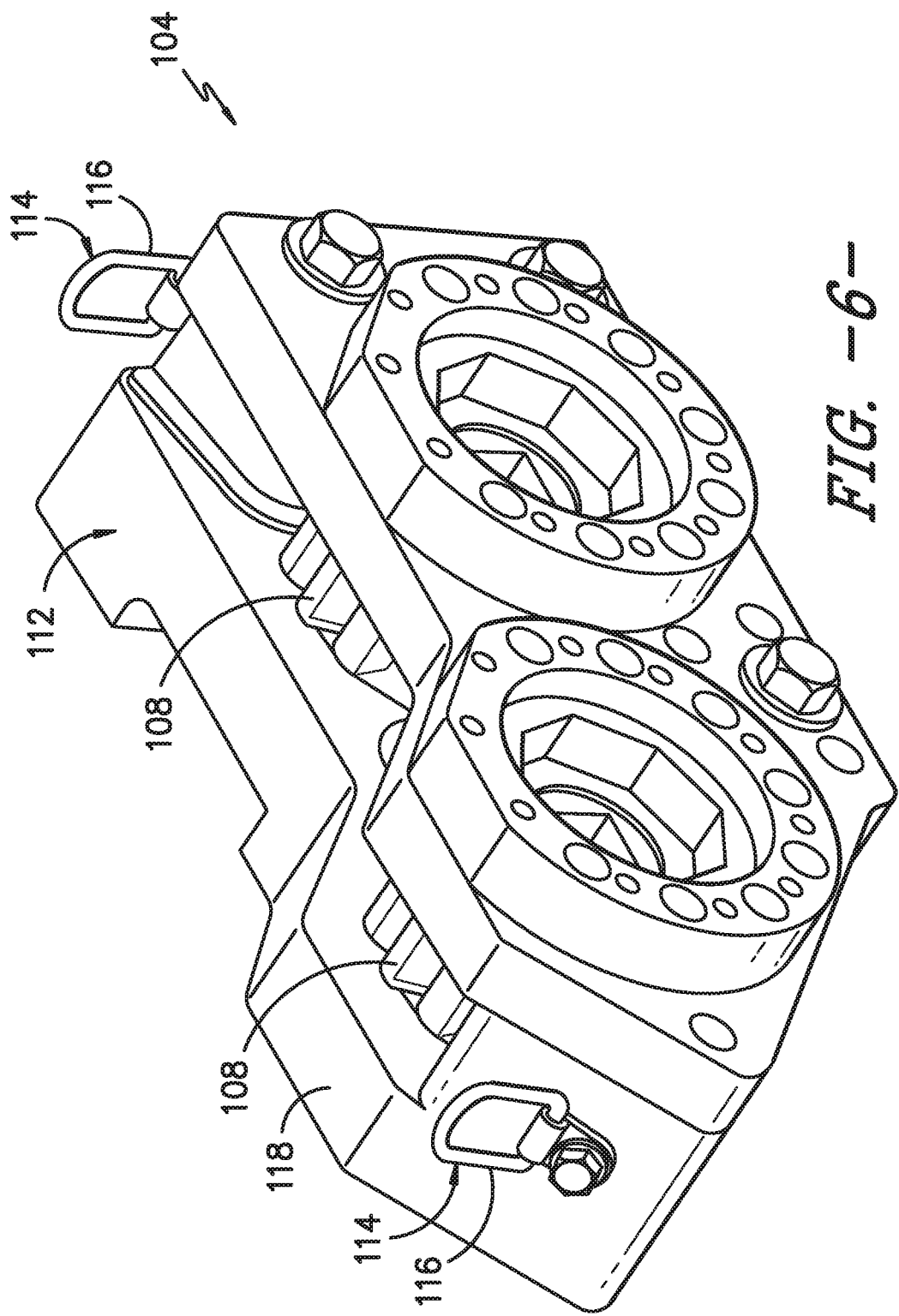

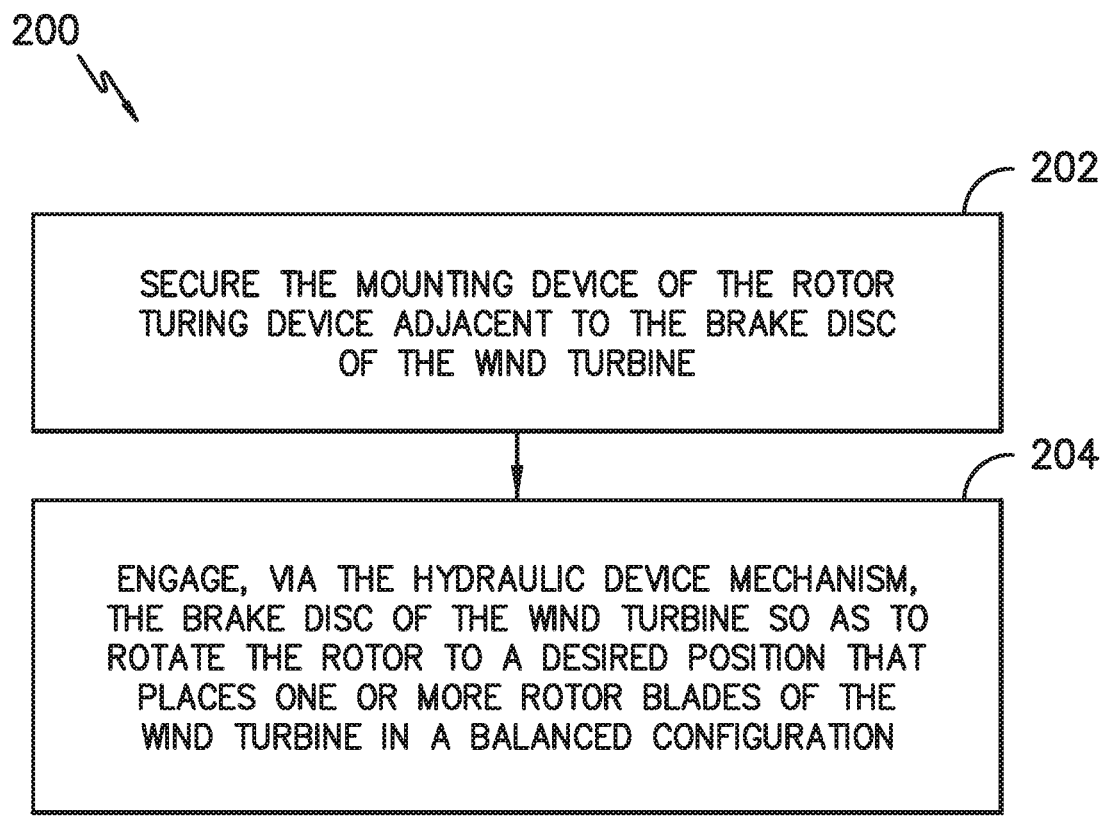
FIG. -7-

ROTOR TURNING DEVICE FOR BALANCING A WIND TURBINE ROTOR

FIELD

The present disclosure relates generally to wind turbines, and more particularly to a rotor turning device for balancing a wind turbine rotor, for example, during rotor blade installation and/or repair.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

Typically, to initially install a rotor blade onto the wind turbine hub, a significantly large crane must be transported to the wind turbine site in order to provide a means for raising the rotor blade relative to the hub. Unfortunately, it is often extremely expensive to both transport the crane to the wind turbine site and operate the crane for the amount of time necessary to install the rotor blade(s). As a result, the costs of employing such large cranes currently accounts for a significant portion of the overall costs associated with initial wind turbine installations.

In addition, as wind turbines continue to increase in size, cranes having the capacity to lift a fully-assembled rotor to certain tower heights are often unavailable in certain geographic locations. Therefore, in such locations, a single blade installation (SBI) process is required. In the SBI process, the hub and rotor blades are installed atop the tower sequentially in consecutive lifts. More specifically, a pneumatic unbalanced rotor turning gear (URTG) drive is typically installed on the backside of the main gearbox which meshes with the teeth on the brake disc. One or more cranes then lift the hub atop the tower so that the hub can be secured to the nacelle. The entire drivetrain is then rotated using the pneumatic URTG drive such that a first axis of the hub is positioned horizontally and a rotor lock is applied. A first rotor blade can then be installed in a horizontal position. After the first rotor blade is secured and the crane(s) have released the blade, the pneumatic URTG device is used to rotate the hub through 120° so that the next rotor blade can be installed. This process is repeated until all rotor blades have been installed.

In most rotor turning applications, the rotor is balanced (i.e. all of the rotor blades are attached to the hub and functioning) and the loads required to turn the rotor are minimal. However, if a rotor blade is under repair, being installed, or is otherwise damaged (such as during the SBI process), an unbalance is introduced and the amount of force required to spin the rotor increases dramatically. More specifically, during the SBI process, the static and aerodynamic load of the unbalanced rotor (e.g. when only one or two rotor blades have been installed) may exceed capacity of the pneumatic URTG device. For example, the highest static load on the drivetrain typically occurs when there is only one rotor blade positioned horizontally or two rotor blades in a "sideways-V" position. In addition, the pneumatic URTG device is generally only suitable for smaller rotor blades (e.g. blades having a length up to about 50 meters). Another issue that arises is that an unbalanced rotor has a single equilibrium point that it will always try to rotate back to. This tendency to rotate back to equilibrium puts a large amount of stress on the pneumatic URTG device, especially when the technician is trying to hold the rotor in place.

Accordingly, an improved rotor turning device for balancing the wind turbine rotor, for example, during rotor blade installation and/or repair so as to address the aforementioned issues would be welcomed in the art.

BRIEF DESCRIPTION

Aspects and advantages of the invention will be set forth in part in the following description, or may be obvious from the description, or may be learned through practice of the invention.

In one aspect, the present disclosure is directed to a rotor turning device for balancing a rotor secured atop a tower of a wind turbine during installation and/or repair of one or more rotor blades of the wind turbine. The rotor turning device includes a hydraulic drive mechanism for operably engaging with a brake disc of the wind turbine. The brake disc is positioned adjacent to a gearbox of the wind turbine. The rotor turning device also includes a mounting device for securing the rotor turning device adjacent to the brake disc of the wind turbine. Thus, when the hydraulic drive mechanism engages the brake disc, the rotor is rotated to a desired position so as to position one or more rotor blades of the wind turbine in a balanced configuration.

In one embodiment the hydraulic drive mechanism may have one or more hydraulic drives. For example, in certain embodiments, the hydraulic drive mechanism may have a plurality of hydraulic drives. Further, each of the hydraulic drives may include a hydraulic motor and a gearbox. In another embodiment, each of the plurality of hydraulic drives may include a pinion secured at an end thereof. Each of the pinions have a plurality of gear teeth that engage teeth of the brake disc such that the plurality of hydraulic drives drive the pinions to engage the teeth of the brake disc, thereby rotating the brake disc.

In further embodiments, the mounting device may include a housing configured to receive the pinions of the plurality of the hydraulic drives. In additional embodiments, the mounting device may include one or more attachment locations secured to an outer surface of the housing. For example, in one embodiment, the attachment location(s) may include D-ring brackets. In addition, the rotor turning device may include one or more straps, slings, or chains arranged through the D-ring brackets for securing the rotor turning device to the brake disc.

In several embodiments, the rotor turning device may further include one or more torque drives for securing the device to a bedplate of the wind turbine. In such embodiments, the torque arm(s) may be secured to the mounting device. In yet another embodiment, the rotor turning device may include a locking mechanism for securing the hydraulic drive mechanism in the desired position.

In another aspect, the present disclosure is directed to a method for balancing a rotor secured atop a tower of a wind turbine during installation and/or repair of one or more rotor blades of the wind turbine. The method includes securing a mounting device of a rotor turning device adjacent to a brake disc of the wind turbine. The rotor turning device may also include a hydraulic drive mechanism for operably engaging with the brake disc. The brake disc is positioned adjacent to a gearbox of the wind turbine. The method also includes engaging, via the hydraulic drive mechanism, the brake disc of the wind turbine so as to rotate the rotor to a desired position that places one or more rotor blades of the wind turbine in a balanced configuration. It should be understood that the method may further include any of the additional steps and/or features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of a wind turbine according to one embodiment of the present disclosure;

FIG. 2 illustrates a perspective, internal view of one embodiment of a nacelle of a wind turbine according to the present disclosure;

FIG. 3 illustrates a simplified, schematic diagram of one embodiment of a brake disc assembly of a wind turbine according to the present disclosure;

FIG. 4 illustrates a front view of one embodiment of a brake disc assembly of a wind turbine with a rotor turning device according to the present disclosure mounted thereto;

FIG. 5 illustrates a perspective view of one embodiment of a rotor turning device according to the present disclosure;

FIG. 6 illustrates a perspective view of one embodiment of a mounting device of a rotor turning device according to the present disclosure; and FIG. 7 illustrates a flow diagram of one embodiment of a method for balancing a rotor secured atop a tower of a wind turbine during installation and/or repair of one or more rotor blades of the wind turbine according to the present disclosure.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a hydraulic rotor turning device that attaches directly into the gearbox and is aligned with the brake disc. The hydraulic drive mechanism then spins the brake disc, which works through the gearbox and rotates the rotor and the rotor blades. The device may also include one or more torque arms which secure the device to the bedplate of the wind turbine to prevent bending and/or to provide a reaction location of the torque generated by the hydraulic drive mechanism.

As such, the hydraulic rotor turning device of the present disclosure provides numerous advantages not present in the prior art. For example, the hydraulic rotor turning device of the present disclosure allows for repairs on broken/damaged rotor blades to be down in the field, up-tower. Further, the hydraulic rotor turning device of the present disclosure enables crane-less pitch bearing exchanges and other future crane-less repairs for larger sized blades. Moreover, the hydraulic rotor turning device of the present disclosure is safe and efficient, as less time is needed for rotor rotation. In addition, the hydraulic rotor turning device of the present disclosure allows unbalanced rotors to be rotated and locked into any desired position.

Referring now to the drawings, FIG. 1 illustrates a side view of one embodiment of a wind turbine 10 according to the present disclosure. As shown, the wind turbine 10 generally includes a tower 12 extending from a support surface 14 (e.g., the ground, a concrete pad or any other suitable support surface). In addition, the wind turbine 10 may also include a nacelle 16 mounted on the tower 12 and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 19 may include more or less than three rotor blades 22. Each rotor blade 22 may be spaced about the hub 20 to facilitate rotating the rotor 19 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

Referring now to FIG. 2, a simplified, internal view of one embodiment of the nacelle 16 of the wind turbine 10 is illustrated. As shown, a generator 24 may be disposed within the nacelle 16. In general, the generator 24 may be coupled to the rotor 18 of the wind turbine 10 for generating electrical power from the rotational energy generated by the rotor 18. For example, the rotor 18 may include a main shaft 26 coupled to the hub 20 for rotation therewith. The generator 24 may then be coupled to the main shaft 26 such that rotation of the main shaft 26 drives the generator 24. For instance, in the illustrated embodiment, the generator 24 includes a generator shaft 28 rotatably coupled to the main shaft 26 through a gearbox 30. However, in other embodiments, it should be appreciated that the generator shaft 28 may be rotatably coupled directly to the main shaft 26. Alternatively, the generator 24 may be directly rotatably coupled to the main shaft 26. In addition, as shown, it should be appreciated that the main shaft 26 may generally be supported within the nacelle 16 by a support frame or bedplate 32 positioned atop the wind turbine tower 12.

Each rotor blade 22 may also include a pitch adjustment mechanism 34 configured to rotate each rotor blade 22 about its pitch axis 36. Further, each pitch adjustment mechanism 34 may include a pitch drive motor 38 (e.g., any suitable electric, hydraulic, or pneumatic motor), a pitch drive gearbox 40, and a pitch drive pinion 42. In such embodiments, the pitch drive motor 38 may be coupled to the pitch drive gearbox 40 so that the pitch drive motor 38 imparts mechanical force to the pitch drive gearbox 40. Similarly, the pitch drive gearbox 40 may be coupled to the pitch drive pinion 42 for rotation therewith. The pitch drive pinion 42 may, in turn, be in rotational engagement with a pitch bearing 44 coupled between the hub 20 and a corresponding rotor blade 22 such that rotation of the pitch drive pinion 42 causes rotation of the pitch bearing 44. Thus, in such embodiments, rotation of the pitch drive motor 38 drives the pitch drive gearbox 40 and the pitch drive pinion 42, thereby rotating the pitch bearing 44 and the rotor blade 22 about the pitch axis 36. Similarly, the wind turbine 10 may include one or more yaw drive mechanisms 46 configured to change the angle of the nacelle 16 relative to the wind (e.g., by engaging a yaw bearing 48 of the wind turbine 10).

Referring now to FIG. 3, a simplified arrangement for one embodiment of a brake disc assembly 50 for 10 wind turbine is illustrated. As mentioned, the main shaft 26 from the hub 20 is tied to the gearbox 30. The output shaft 28 (also referred herein as a generator shaft) from the gearbox 30 drives the rotor shaft (internal) to the generator 24. Situated between the gearbox 30 and the generator 24 on the gearbox output shaft 240 is the brake disc assembly 50. Further, as shown, the brake disc 50 includes a cylindrical brake disc 52 on the gearbox output shaft 28 and a brake caliper 54 (mounting not shown). Although only one brake caliper 54 is shown, a plurality of brake calipers may be mounted circumferentially around outer radial end surfaces 56 of the cylindrical brake disc 52.

Still referring to FIG. 3, a rotor turning device 100 is also illustrated mounted to the brake disc 52 for balancing the rotor 20 during installation and/or repair of one or more rotor blades 22 of the wind turbine 10. More specifically, as shown in FIGS. 4-6, various detailed views of the rotor turning device 100 according to the present disclosure are illustrated. As shown particularly in FIG. 4, a front view of the brake disc 52 with the rotor turning device 100 mounted thereto is illustrated. In addition, as shown, the rotor turning device 100 may further include one or more torque arms 66 for securing the device 100, e.g. to the bedplate 32 of the wind turbine 10. In such embodiments, the torque arm(s) 66 are configured to prevent bending and/or may provide a location for the torque to react from.

Further, as mentioned and as shown, the brake disc 52 may include one or more calipers 54 (only of which is shown), which are axially inlet by means of a pressing device 58 to the brake disc 52 and can be moved away. These components of the brake disc 52 may be mounted on a support member 60, which is secured to the gearbox via one or more screws 62. In addition, as shown, the brake disc 52 may include a plurality of radially-projecting gear teeth 64 at its circumference.

Referring now to FIGS. 5 and 6, further detailed views of various components of the rotor turning device 100 according to the present disclosure are illustrated. More specifically, as shown in FIG. 5, the rotor turning device 100 includes a hydraulic drive mechanism 102 for operably engaging with the brake disc 52 of the wind turbine 10. In addition, as shown in FIGS. 4-6, the rotor turning device 100 also includes a mounting device 104 for securing the rotor turning device 100 adjacent to the brake disc 52 of the wind turbine 10. Thus, when the hydraulic drive mechanism 102 engages the brake disc 52, the rotor 20 is rotated to a desired position so as to position one or more rotor blades 22 of the wind turbine 10 in a balanced configuration. In such embodiments, the torque arm(s) 66 may be secured to the mounting device 104 (FIG. 4).

More particularly, as shown in FIG. 5, the hydraulic drive mechanism 102 may have one or more hydraulic drives 106. For example, as shown, the hydraulic drive mechanism 102 has two hydraulic drives 106. In further embodiments, the hydraulic drive mechanism 102 may have any suitable number of hydraulic drives 106 including less than two drives and more than two drives. Moreover, as shown, each of the hydraulic drives 106 may include a hydraulic motor 107 (such as a radial piston motor) and a gearbox 109 (such as a multi-stage planetary gearbox). In another embodiment, each of the hydraulic drives 106 may have a pinion 108 secured at an end thereof. Further, as shown, each of the pinions 108 have a plurality of gear teeth 110 that engage the teeth 64 of the brake disc 52 such that rotation of the plurality of hydraulic drives 106 drives the pinions 108 to engage the teeth 64 of the brake disc 52, thereby rotating the brake disc 52 and in turn, the rotor 20. One advantage of having two hydraulic drives 106 is that, since each hydraulic drive 106 is fed from one common power supply, the pressure each motor sees is the same and—neglecting the minute internal leakage—the output torque of both motors is the same. Hence, the load is shared almost perfectly between the two drive pinions 108 that mesh with the brake disc gearing.

In another embodiment, the rotor turning device 100 may also include a locking mechanism 120, e.g. at opposing ends of the pinions 108, for securing the hydraulic drive mechanism 102 (i.e. the hydraulic drives 106) in the desired position, which also locks the rotor 20 in place.

As shown particularly in FIGS. 5 and 6, the mounting device 104 may include a housing 112 configured to receive the pinions 108 that are positioned at the ends of the hydraulic drives 106. In additional embodiments, the mounting device 104 may include one or more attachment locations 114. For example, as shown, the housing 112 of the mounting device 104 may define an outer surface 118. In such embodiments, the attachment location(s) 114 may be secured to the outer surface 118 of the housing 112. In certain embodiments, as shown, the attachment location(s) 114 may include D-ring brackets. Thus, in particular embodiments, the rotor turning device 100 may include one or more straps, slings, or chains 122 (FIG. 4) arranged through the D-ring brackets 116 and around the brake disc 52 (and/or the shaft 28) for securing the rotor turning device 100 thereto.

Referring now to FIG. 7, a flow diagram of one embodiment of a method for balancing a rotor secured atop a tower of a wind turbine during installation and/or repair of one or more rotor blades of the wind turbine according to the present disclosure is illustrated. In general, the method 200 will be described herein with reference to the wind turbine 10 and rotor turning device 100 shown in FIGS. 1-6. However, it should be appreciated that the disclosed method 200 may be implemented with any wind turbine having any other suitable configurations. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (202), the method 200 includes securing the mounting device 104 of the rotor turning device 100 adjacent to the brake disc 52 of the wind turbine 10. As mentioned, the rotor turning device 100 may also include a hydraulic drive mechanism 102 for operably engaging with the brake disc 52. Thus, as shown at (204), the method 200 includes engaging, via the hydraulic drive mechanism 102, the brake disc 52 of the wind turbine 10 so as to rotate the rotor 20 to a desired position that places one or more rotor blades 22 of the wind turbine 10 in a balanced configuration.

In one embodiment, engaging, via the hydraulic drive mechanism 102, the brake disc 52 of the wind turbine 10 may include engaging gear teeth 110 of the pinions 108 secured at ends of the hydraulic drives 106 with the brake disc teeth 64 and driving the pinions 108 via the plurality of hydraulic drives 106, thereby rotating the brake disc 52. In another embodiment, the method 200 may include securing one or more straps, slings, or chains 122 through the D-ring brackets 116 and around the brake disc 52. In further embodiments, the method 200 may include securing the rotor turning device 100 to the bedplate 32 of the wind turbine 10 via one or more torque arms 66. In additional embodiments, the method 200 may include securing the hydraulic drive mechanism 102 in the desired position via the locking mechanism 120.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor turning device for balancing a rotor secured atop a tower of a wind turbine during installation and/or repair of one or more rotor blades of the wind turbine, the rotor turning device comprising:
    a hydraulic drive mechanism for operably engaging with a brake disc of the wind turbine, the brake disc positioned adjacent to a gearbox of the wind turbine, the hydraulic drive mechanism comprises at least one hydraulic drive comprising a pinion at an end thereof, the pinion comprising a plurality of gear teeth; and,
    a mounting device for securing the rotor turning device adjacent to the brake disc of the wind turbine, the mounting device comprising a housing defining a first surface spaced apart from a second surface, wherein the plurality of gear teeth of the pinion are arranged between the first and second surfaces of the mounting device and engage with gear teeth of the brake disc,
    wherein, when the hydraulic drive mechanism is activated, the at least one hydraulic drive drives the pinion such that the plurality of gear teeth of the pinion engages the gear teeth of the brake disc to rotate the rotor to a desired position so as to position one or more rotor blades of the wind turbine in a balanced configuration.

2. The rotor turning device of claim 1, wherein the hydraulic drive mechanism comprises one or more hydraulic drives, the one or more hydraulic drives comprising a hydraulic motor and a gearbox.

3. The rotor turning device of claim 2, wherein the hydraulic drive mechanism comprises a plurality of hydraulic drives.

4. The rotor turning device of claim 3, wherein each of the plurality of hydraulic drives comprises a pinion secured at an end thereof, each of the pinions comprising a plurality of gear teeth that engage the gear teeth of the brake disc such that the plurality of hydraulic drives drive the pinions to engage the gear teeth of the brake disc, thereby rotating the brake disc.

5. The rotor turning device of claim 1, wherein the mounting device further comprises one or more attachment locations secured to an outer surface of the housing.

6. The rotor turning device of claim 5, wherein the one or more attachment locations comprise D-ring brackets.

7. The rotor turning device of claim 6, further comprising one or more straps, slings, or chains arranged through the D-ring brackets for securing the rotor turning device to the brake disc.

8. The rotor turning device of claim 1, further comprising one or more torque arms for securing the rotor turning device to a bedplate of the wind turbine.

9. The rotor turning device of claim 8, wherein the one or more torque arms are secured to the mounting device.

10. The rotor turning device of claim 1, further comprising a locking mechanism for securing the hydraulic drive mechanism in the desired position.

11. A method for balancing a rotor secured atop a tower of a wind turbine during installation and/or repair of one or more rotor blades of the wind turbine, the method comprising:
    securing a mounting device of a rotor turning device adjacent to a brake disc of the wind turbine, the mounting device having a housing defining a first surface spaced apart from a second surface, the rotor turning device further having a hydraulic drive mechanism having at least one hydraulic drive comprising a pinion at an end thereof, the pinion comprising a plurality of gear teeth arranged between the first and second surfaces of the mounting devices for operably engaging with gear teeth of the brake disc, the brake disc positioned adjacent to a gearbox of the wind turbine; and,
    engaging, via the plurality of gear teeth of the pinion of at least one hydraulic drive of the hydraulic drive mechanism, the gear teeth of the brake disc of the wind turbine so as to rotate the rotor to a desired position that places one or more rotor blades of the wind turbine in a balanced configuration.

12. The method of claim 11, wherein the hydraulic drive mechanism comprises a plurality of hydraulic drives, each of the plurality of hydraulic drives driven by one or more hydraulic cylinders.

13. The method of claim 11, wherein the mounting device further comprises one or more attachment locations secured to an outer surface of the housing.

14. The method of claim 13, wherein the one or more attachment locations comprise D-ring brackets.

15. The method of claim 14, further comprising securing one or more straps, slings, or chains through the D-ring brackets and to the brake disc.

16. The method of claim 1, further comprising securing the rotor turning device to a bedplate of the wind turbine via one or more torque arms.

17. The method of claim 16, further comprising securing the hydraulic drive mechanism in the desired position via a locking mechanism.

* * * * *